United States Patent [19]

Hahn

[11] 4,188,556
[45] Feb. 12, 1980

[54] ELECTRO-MECHANICAL MACHINE

[75] Inventor: James H. Hahn, Ft. Lauderdale, Fla.

[73] Assignee: ACR Electronics, Inc., Hollywood, Fla.

[21] Appl. No.: 816,610

[22] Filed: Jul. 18, 1977

[51] Int. Cl.$^2$ ............................................. H12K 23/04
[52] U.S. Cl. ..................................... 310/268; 310/154
[58] Field of Search ............... 310/268, 267, DIG. 6, 310/154, 112, 208, 198, 185, 201, 206, 237

[56] References Cited

U.S. PATENT DOCUMENTS

| | | | |
|---|---|---|---|
| 271,928 | 2/1883 | Seeley | 310/268 |
| 2,847,589 | 8/1958 | Haydon | 310/268 X |
| 3,096,455 | 7/1963 | Hahn | 310/268 |
| 3,312,846 | 4/1967 | Henry-Baudot | 310/268 X |
| 3,678,314 | 7/1972 | Carter | 310/268 |

Primary Examiner—Donovan F. Duggan
Attorney, Agent, or Firm—Darby & Darby

[57] ABSTRACT

A disc-type motor characterized by increased efficiency is disclosed. The motor includes first and second parallel spaced stator members made of magnetic material in fixed relation, each of the stator members having a flat circular shape and an even plurality of pie-shaped permanent-magnet poles thereon, illustratively eight in number. The facing poles on the stator members have opposite polarities. The motor further includes a disc-like rotor made of a non-conducting material rotatably mounted between the two stator members. Conducting wires are wound in a non-overlapping (single-layer) flat spiral configuration to form a number of coils equal to twice the number of poles per stator member, half adhered to each face of the rotor disc. Each coil encloses a pie-segmented area about equal to the area of one of the stator poles. On each face of the rotor the coils magnetically oppose one another, and the coils on one face of the disc are angularly offset from the coils on the other face of the disc. The motor further includes a commutator connected to the rotor, the commutator including twice as many bars of conducting material as there are coils on each rotor face, with certain of the commutator bars electrically interconnected.

11 Claims, 7 Drawing Figures and disadvantages may be most efficaciously avoided or minimized.

It is a further object of the invention to provide such a machine which is characterized by increased efficiency.

ELECTRO-MECHANICAL MACHINE

BACKGROUND OF THE INVENTION

This invention relates to electro-mechanical machinery and more particularly to such machinery utilizing a disc-type rotor.

Electrical machines, such as motor or generators, utilizing disc-type rotors as well known in the art. Such machines utilizing wires conventionally wound on the disc rotors are frequency unsatisfactory in that the rotors are undesirably bulky and irregular winding arrangements are required. The arrangement of conventional wires into a suitable winding pattern usually results in the cross-over of wires in the magnetic gap thereby resulting in a large gap and a consequential reduction in flux in the air gap.

To overcome the aforementioned disadvantages, printed circuit-type machines in which a conductive pattern is coated on the faces of a thin disc of insulating material to form the armature have been provided. An example of such a printedtype armature can be found in U.S. Pat. No. 2,970,238 issued to Swiggett on Jan. 31, 1961. These types of motors provide a number of advantages. For example, these machines exhibit virtually no magnetic flux distortion and no eddy current induction. The printed circuit armature machines are further advantageous in that they may include a large number of poles without increasing eddy loss and while increasing the back e.m.f. The printed circuit machines, however, suffer from the disadvantage that, when fabricating a high power machine, the thickness of the copper windings must be increased which is difficult to accomplish by etching techniques. Furthermore, the limitations of etching techniques are such that the minimum obtainable separations between armature conductors are on the order of twenty to thirty thousandths of an inch. This of course, limits the number of turns of wire which can be provided in a given area. In addition, etching techniques require thin metal conductors and this increases the resistance of the armature winding. The combination of relatively few turns in a given area combined with relatively high armature resistance results, of course, in a relatively low power machine. A further drawback to the printed circuit armature machine is that, because the conductive pattern is coated on the two faces of the disc-like armature, connections must be made between the conductors on both faces or sides of the disc. This involves clips or pads which extend over the outer and inner peripheral edges of the disc and these clips or pads must be soldered or welded to the conductors. The extremely large number of connectors required adds substantially to the cost of manufacture and, in addition, substantially increases the likelihood of an open circuit (due to a weld or solder failure) in the winding.

SUMMARY OF THE INVENTION

It is, therefore, an important object of the present invention to provide an improved electro-mechanical machine by means of which the aforesaid drawbacks and disadvantages may be most efficaciously avoided or minimized.

It is a further object of the invention to provide such a machine which is characterized by increased efficiency.

It is yet another object of this invention to provide an electro-mechanical machine which is characterized by reduced distortion in its magnetic field.

It is still another object of the invention to provide an electro-mechanical machine having a disc-type rotor in which the armature coils on one face of the disc are connected in simple manner to the coils on the other face.

It is yet a further object of this invention to provide an electro-mechanical machine with wire-wound armature in which each winding has a transverse thickness equal to the thickness of a single wire of the coil.

Generally speaking, the objectives of the present invention are attained by the provision of an electro-mechanical machine comprising first and second stator members, made of magnetic material in fixed spaced relation and each forming N field pole pairs, a disc-like rotor made of a non-conducting material and positioned between the stator members, and 4 conducting wires wound on the rotor and forming 2N coils on each face, each wire forming one half of the coils on one face of the disc.

BRIEF DESCRIPTION OF THE DRAWINGS

The foregoing and other objects and features of the present invention will be more clearly understood from the following detailed description thereof when read in conjunction with the accompanying drawings in which.

DESCRIPTION OF THE PREFERRED EMBODIMENT

Figure 1:
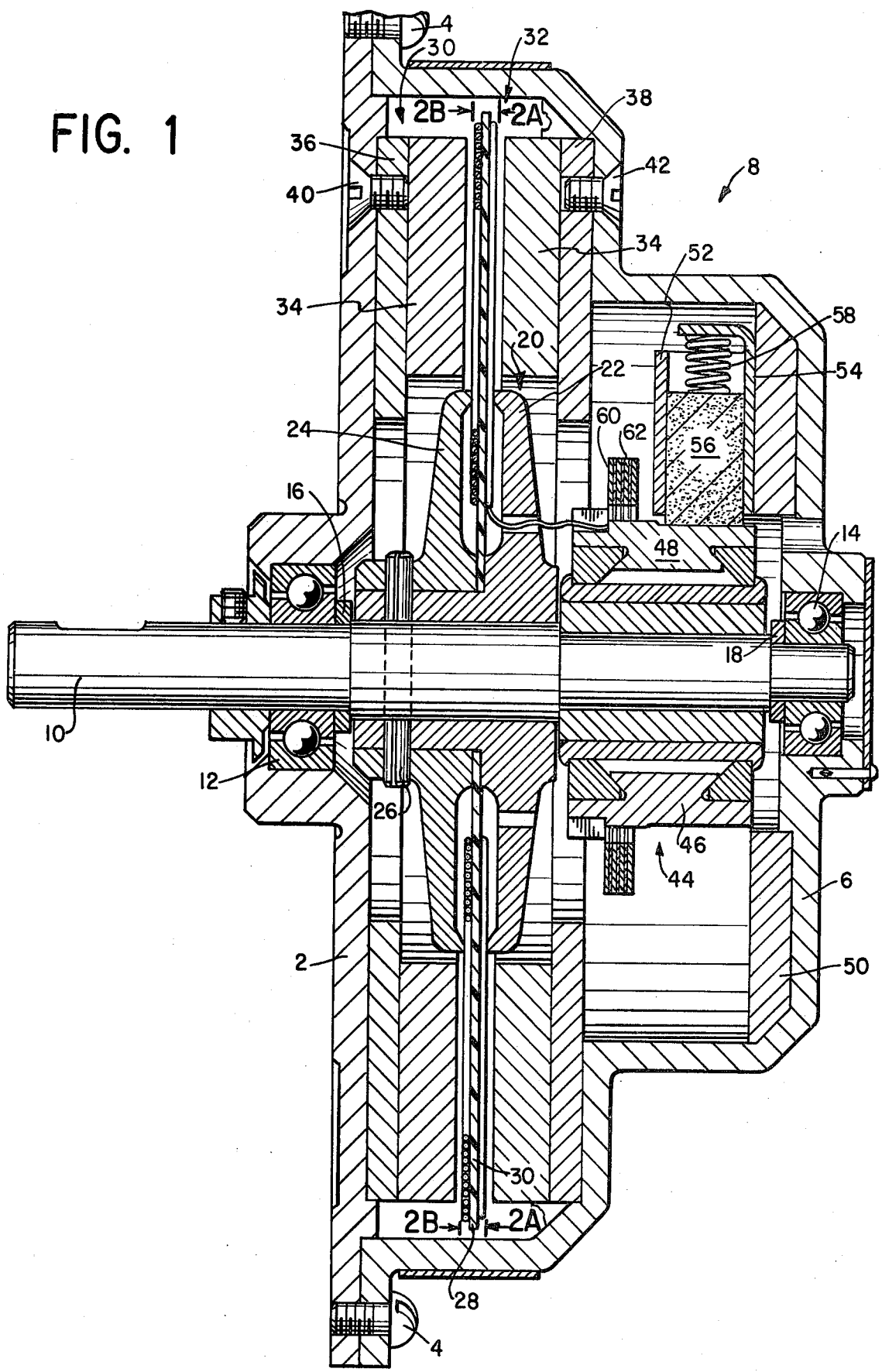
FIG. 1 is an axial cross-sectional view of an electro-mechanical machine according to the invention.

Turning now to FIG. 1, there is illustrated a crosssectional plan view of an electro-mechanical machine utilizing a disc-type armature. A housing-half 2 is connected, by any conventional means, for example screws, one of which is indicated at 4, to another housing-half 6 to form the machine housing indicated generally at 8. Rotatably mounted within the housing 8 by means of front bearings 12 and rear bearings 14 is a shaft 10. Washers 16 and 18 are positioned between the shaft 10 and the front and rear bearings, respectively. Within the housing 8 and mounted about the shaft 10 is an armature hub indicated generally at 20 which includes hub-half 22 and hub-half 24. The hub halves 22 and 24 are connected to one another and to the shaft so as to rotate therewith, as by a roll pin 26 passing through the two hub halves and the shaft 10. Suitably secured between the two hub halves 22 and 24 to rotate therewith is a disc-shaped rotor 28 made of a nonconducting, nonmagnetic material, such as, for example, a phenolic. Secured to the rotor 28 as by adhesive or the like are a plurality of conducting wires forming armature coils 30, which will be more fully discussed below. Fixedly connected to the machine housing 8 are first and second spaced stator members, indicated at 30 and 32. Each of the stator members 30 and 32 includes a plurality of flat pie-segmented permanent magnets, indicated at 34, which may, for example, be constructed of ceramic ferrite. Each of the permanent magnets 34 is magnetized through thickness, so one face is of one polarity and the other face of opposite polarity. The magnets may be fixedly secured to a metal backing plate in the form of a ring made as of soft iron or steel, the two back-up rings being indicated at 36 and 38, respectively. The two back-up rings are fixedly connected to the housing 8 by any conventional means, for example, by countersunk screws, indicated at 40 and 42, respectively. Alternatively, the stators may be formed of ceramic ferrite discs, suitably magnetized to form the field poles.

Fixedly connected to the shaft 10 and rotating therewith is a commutator indicated generally at 44. The commutator 44 includes a plurality of segments or bars of a conductive material, such as, for example, copper, suitably isolated from one another by, for example, mica. The commutator is, of course, also electrically isolated from the armature shaft 10 on which it is mounted. Two of the copper bars of the commutator are indicated at 46 and 48. Fixed to the rear housing 6 is a brush holder mount 50 to which is attached a brush holder 52 and a brush holder clip 54. A brush 56 is positioned between the brush holder 52 and the brush holder clip 54 and is maintained in electrical contact with the commutator bar 46 by a spring 58 positioned between the brush 56 and the brush holder clip 54. Other brushes, as needed, are similarly mounted in relation to the commutator.

The permanent magnets 34 of the stator may advantageously be made of a ceramic ferrite and the back-up ring may be made of a magnetic material such as a soft iron or steel. It should be noted that the magnets 34 may be adhered, by means of an elastic cement, for example, to the soft steel back-up ring before the stator is magnetized.

It is here appropriate to note that the stator pole magnets 34 are, as previously indicated, in this example, made of ceramic ferrite material. Ceramic ferrite permanent magnets are utilized rather than alnico magnets, although, as is well known, alnico magnets have substantially greater strength than do ceramic ferrite magnets, since alnico is relatively expensive and is, therefore, not economically feasible for low-cost, battery-powered, motors. It is further noted that the individual pole pieces have a pie-segmented configuration so that the pole area for each is maximized. It is also possible to utilize a continuous ring of ceramic ferrite, magnetizing adjacent sections in alternate polarity, thereby further increasing the magnetic area, although this is less desirable since such a continuous ceramic ferrite structure is frangible and subject to breakage, even when adhered by means of an elastic glue to the magnetic back-up ring. Utilizing individual pie-segmented pole pieces is preferable since there is little reduction in total pole area and substantial reduction in the likelihood of stator breakage.

Figure 2A:
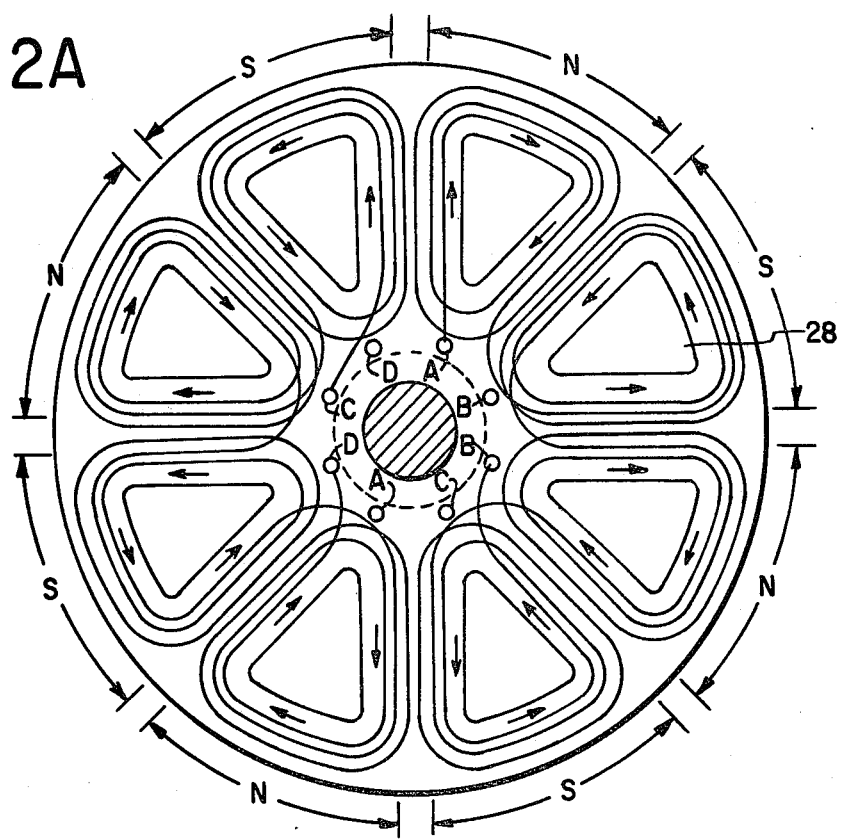
FIGS. 2A and 2B illustrate the two sides of an 8 pole armature wound according to the invention.
Figure 2B:
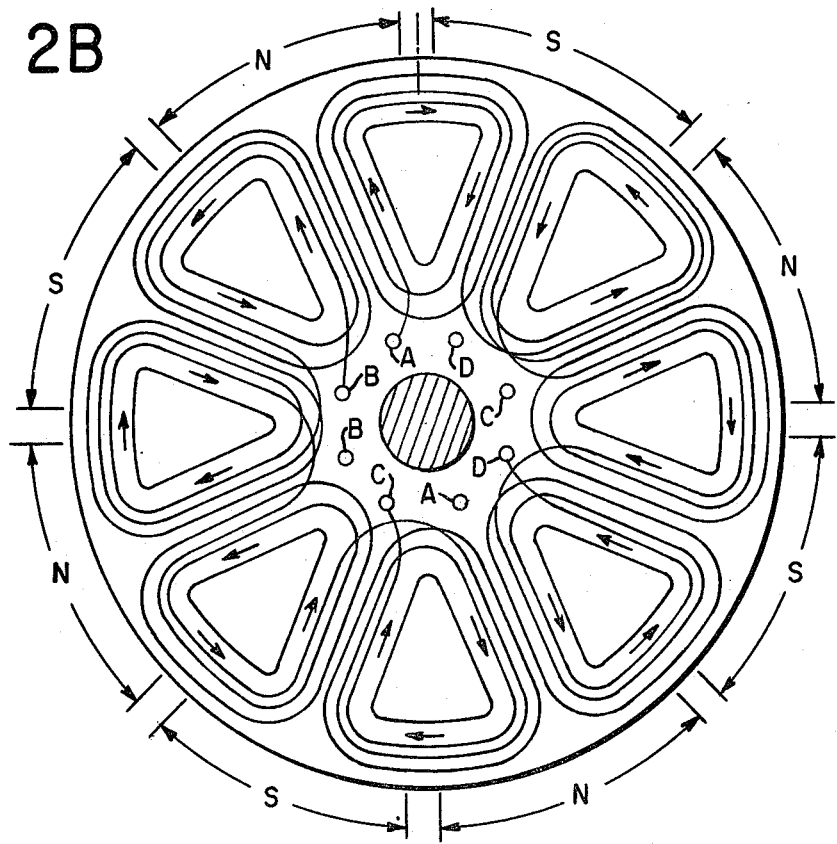

Turning now to FIGS. 2A and 2B, there are illustrated the two sides of a winding pattern for an eight-pole rotor. A preferred arrangement in this embodiment is four groups of armature coils, which attains a reduced size of commutator brush circle and a more uniform coil distribution on the rotor disc. It will be noted that in this illustration only four wires are utilized, each wire forming the group of coils on one-half of each face of the rotor disc 28.

As seen in FIG. 2A, on the front face of the rotor one wire forms the four right-hand coils, and extends from a point A successively through four coils to point B. A second wire extends from point C successively through four coils to point D. The coils are arranged so that current will flow in the same direction through the side-by-side conductors of adjoining coils. On the rear face of the rotor, as seen in FIG. 2B, the coils are staggered 90 electrical degrees (one-half of the pitch angle of the stator poles) clockwise with respect to those on the front face. It should be understood that the rotor in FIG. 2B is depicted in relation to the same magnetic poles shown in FIG. 2A but which are reversed in the rear view. On this rear face, one wire starts at point B and extends through four successive coils to point C, while a further wire starts at point A and extends through four successive coils to point D. As shown below, points A, B, C, D are connected to respective sets of commutator segments. By winding each group of coils from a single piece of wire, a maximum of 8 connections to the commutator becomes necessary, regardless of the number of field poles.

In this preferred embodiment, all coils have the same number of turns (e.g. 8 turns). However, this is not essential; the coils may have different numbers of turns, although it is preferable that each of the pair of diametrically opposite coils on the same rotor face should have the same number of turns.

In manufacture, it has been found most efficient to wind the wire on a form to form an individual coil which conforms to the shape of the stator pole area. The wires are wound so that there is no overlap of the turns and they are therefore only a single layer thick. Each coil is then suitably adhered or otherwise secured to the rotor disc and connected as stated to the points A, B, C, D. It will thus be seen that the armature is a thin structure made up only of the thickness of the insulating disc plus the thickness of two layers of the wire utilized, one layer of wire being on each side of the disc.

The arrangement permits the armature conductors to pass very close to the stator magnet surfaces on both sides of the rotor disc, permitting relatively large air gaps between the field magnets, in excess of ¼ inch in some cases. This results in permitting a larger copper area in the armature, with resultant increase in horsepower for a given size and corresponding increase in efficiency. It also reduces the armature reaction problems of reversible motors. The exposed coil windings on the disc somewhat increase the windage, but heat extraction is greater and higher continuous-duty ratings are possible for the same size wire. However, when high speeds are desired, windage may be reduced by cementing a thin (e.g. 0.002 inch) fiber glass or other smooth plastic disc to each face of the rotor disc. This thin armature structure also provides the advantage that a minimum number of bars must be used in the commutator.

Figure 3:
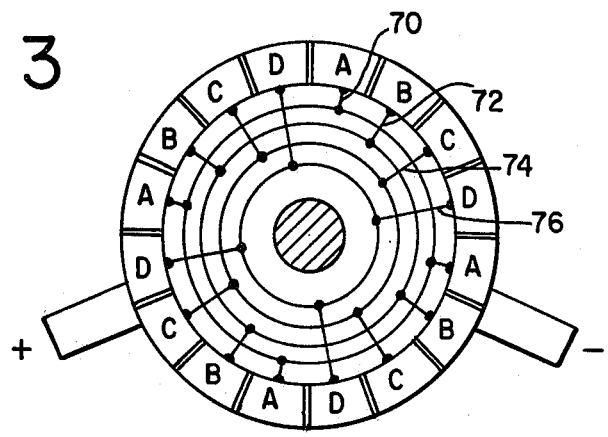
FIG. 3 is a schematic diagram of a commutator arranged for use with the armature illustrated in FIGS. 2A and 2B.

Turning now to FIG. 3, there is illustrated a schematic diagram of a commutator for use with the armature illustrated in FIGS. 2A and 2B. It will be seen that the commutator 44 is arranged to have twice as many segments or bars as there are field poles. In this illustration there are four segments for each pair of stator poles and every fourth one of the sixteen segments forming the commutator (i.e., those indicated by the respective letters A, B, C and D) are electrically connected to one another by respective conductors, indicated at 70, 72, 74 and 76. Such connectors may be readily made by use of stamped jumper rings 62 (FIG. 1). While the coils of each group are preferably connected in series between the respective pair of commutator segments, it will be understood that they may be connected in parallel or in series-parallel. The commutator segments A, B, C, D are respectively connected to points A, B, C, D on the rotor windings of FIGS. 2A and 2B. The index markings in FIGS. 2A, 2B and 3 are utilized to enable the appropriate alignment of the commutator, the armature and the stator for maximum efficiency of operation of the machine. The maximum brush width is preferably approximately 60% to 80% of the commutator bar width. Although such an arrangement gives a varying resistance as the armature rotates, the torque remains quite stable.

As seen in FIG. 3, the two commutator brushes are positioned at an angle such that one brush straddles segments A-B when the other straddles segments D-C. If there are N pole pairs, then the brush separation is $(n+\frac{1}{2})(360°/N)$, where n is any integer from zero to N. For higher currents, several pairs of brushes may be used, each additional pair being spaced from the first pair by 90° or a multiple thereof. Since brushes spaced by such intervals will contact inter-connected segments, such brushes may be connected in parallel. This not only permits larger currents and power, but reduces commutator arcing and ring fire.

Figure 4A:
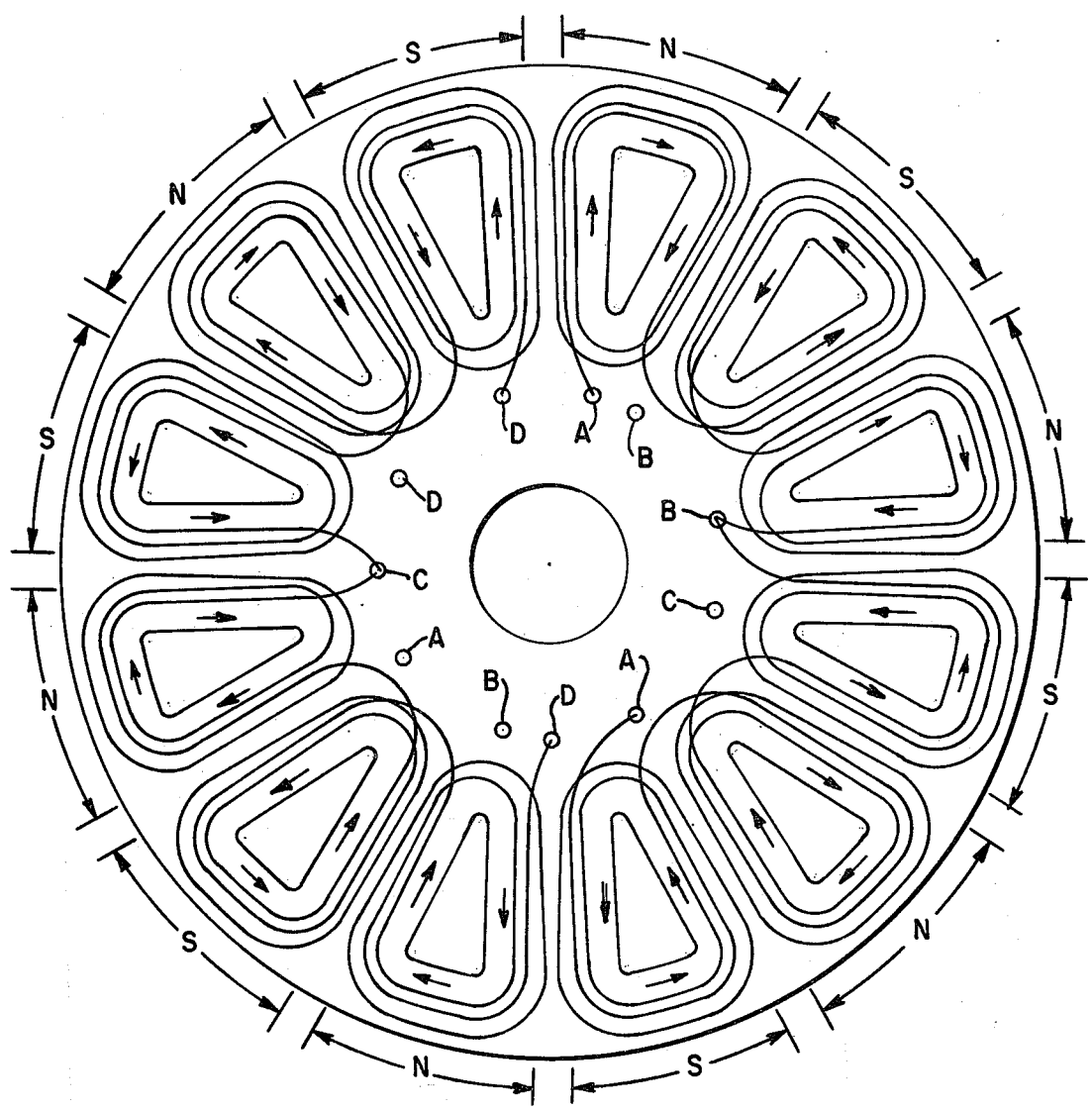
FIGS. 4A and 4B illustrate both sides of a 12 pole armature disc wound according to the invention.
Figure 4B:
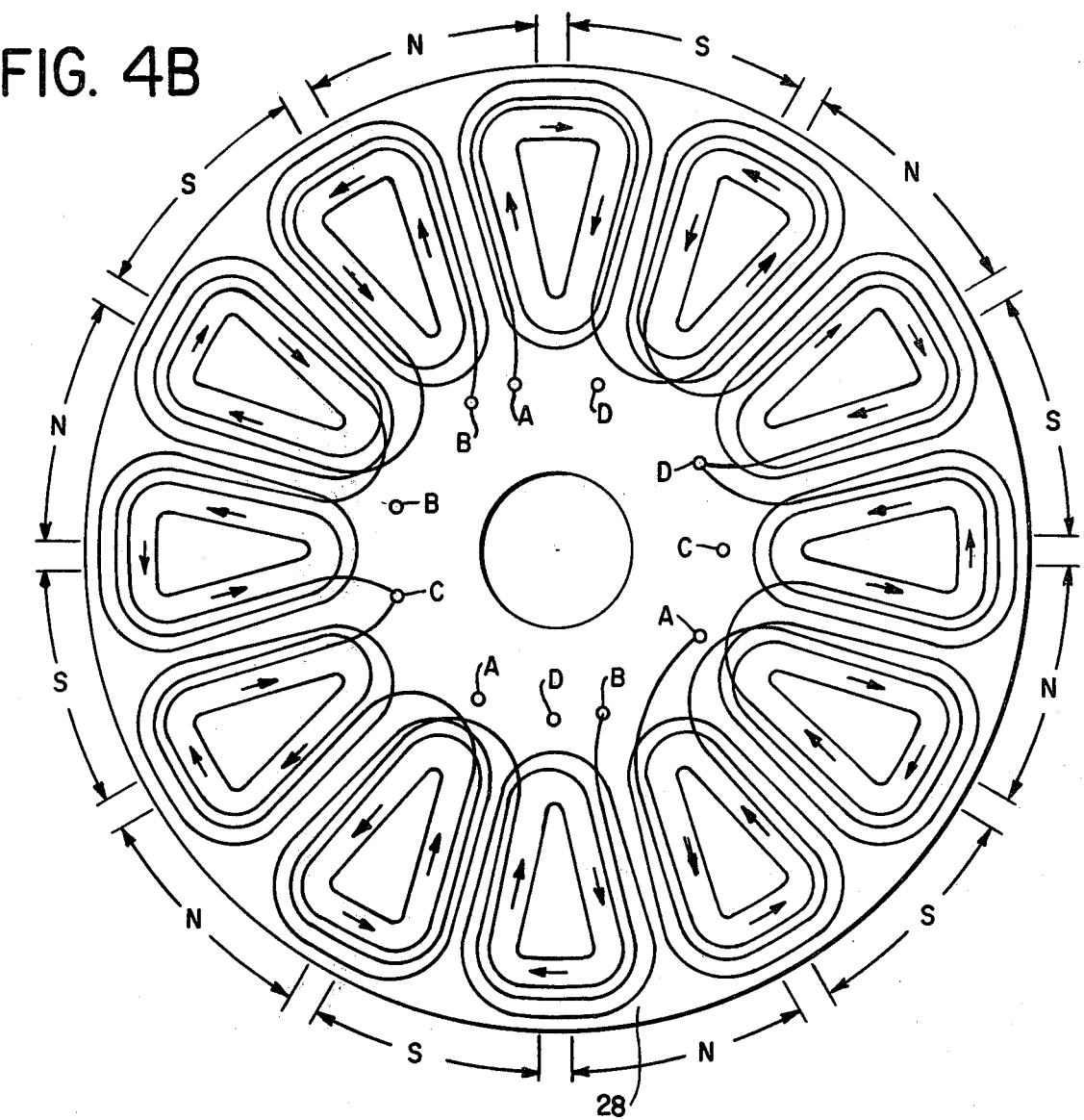

Turning now to FIGS. 4A and 4B, there is illustrated an armature winding pattern for use with the disc rotor 28 illustrating a 12 pole configuration. In this structure, as well as with the structure illustrated in FIGS. 2A and 2B, it will be noted that only four wires are used to wind the armature, one wire forming half the coils on each side of the disc. In this instance, the coils of each of the four groups are connected in series-parallel (with 3 in series in parallel to another 3 in series) rather than in series as in the preceding embodiment. In this structure also, only non-overlapping spiral windings are utilized for the coils, resulting in coils having a thickness equal to that of a single wire.

Figure 5:
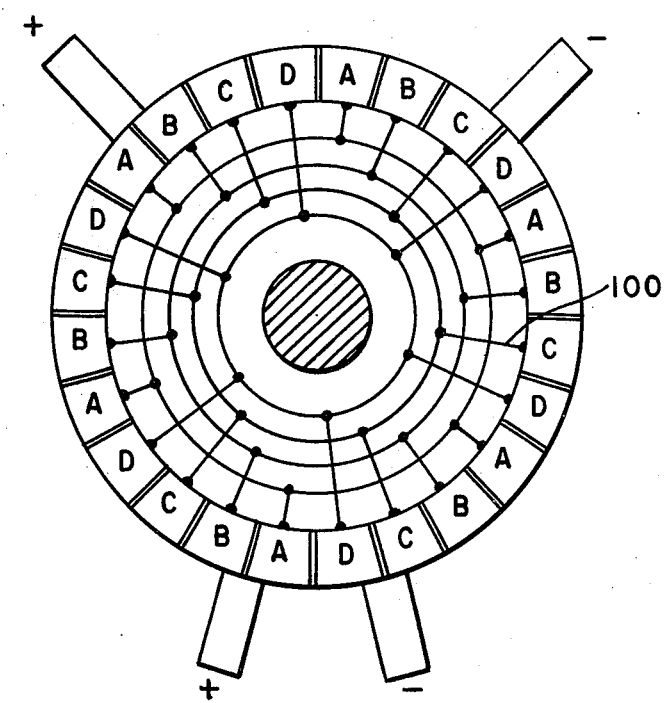
FIG. 5 is a schematic diagram of a commutator arranged for use with the armature illustrated in FIGS. 4A and 4B.

Turning to FIG. 5, there is illustrated a commutator which is adapted for use with the armature illustrated in FIGS. 4A and 4B. The commutator includes 24 segments (again twice the number of poles) and, in this embodiment, as was the case of the commutator embodiment illustrated in FIG. 3, every fourth bar of the commutator is connected together by means, for example, of electrical conductors indicated at 100. Again, one of the four coil groups is connected to segments A-B, another to C-D, a third to B-C and a fourth to D-A.

Although the invention has been described with respect to 8 and 12 pole configurations, it will be understood that other numbers of poles may be used, with as few as six poles or even more than twelve, depending on the size and speed of the motor. For example, 8 to 10 poles may be used for small fractional horsepower motors, and larger numbers of poles for slower speed motors, which would increase horsepower and decrease weight.

The present invention provides a compact, low-weight, high-efficiency motor particularly applicable to moderate to low voltage portable battery or D.C. applications. Due to the low weight relative to power and the small amount of copper required, these motors are economical to produce. Efficiencies of 70 to 85%, depending on speed, are attainable. Power can be further increased by use of square rather than the customary round wire, with little change in weight.

Also, the same machine may serve either as a motor or a generator.

It will be understood that the foregoing description of the preferred embodiments of the present invention is for purposes of illustration only, and that the various structural and operational features as herein disclosed are susceptible to a number of modifications and changes none of which entail any departure from the spirit and scope of the present invention as defined in the appended claims.

What is claimed is:

1. An electro-mechanical machine comprising:
   first and second flat spaced parallel stator members, each having a circular array of 2N magnetic poles of alternately opposite polarity, where N is a number of pairs of such poles, each pole of one stator member being opposite and spaced from an opposite-polarity pole of the other stator member,
   a disc armature rotor between said stator members having an array of coils on each face thereof, and
   a commutator rotatable together with said rotor and having 4N segments, with N sequential sets of four sequential segments each, the N corresponding (i.e., first, second, third, or fourth) segments of each set being interconnected,
   the coil array on one rotor face being angularly displaced relative to the coil array of the other rotor face by one half of the angular pitch between two adjacent coils, the coils on one half of one face of said rotor being connected together and to one pair of segments of said commutator segment sets, the coils on the other half of said one face of said rotor being connected together and to the remaining pair of segments of said segment sets, the coils on one half of the other face of said rotor being connected together and to a segment of said one pair and a segment of said remaining pair, and the coils on the other half of said other rotor face being connected together and to the other segment of said one pair and the other segment of said remaining pair.

2. An electromechanical machine comprising:
   first and second flat spaced parallel stator members, each having a circular array of 2N magnetic poles of alternately opposite polarity, where N is a number of pairs of such poles, each pole of one stator member being opposite and spaced from an oppositepolarity pole of the other stator member,
   a disc armature rotor between said stator members having an array of coils on each face thereof,
   a commutator rotatable together with the rotor and having 4N segments operatively connected to the coil arrays, and
   at least one pair of brushes contacting said commutator, the brushes of each pair being separated by an angle of substantially $(n+\frac{1}{2})(360/N)$ degrees, where n is an integer including zero.

3. A machine as in claim 2 said segments being arranged in N sequential sets of four sequential segments each, the N corresponding (i.e. first, second, third or fourth) segments of each set being interconnected.

4. A machine as in claim 1 and at least one pair of brushes contacting said commutator, the brushes of each pair being separated by an angle of substantially $(n+\frac{1}{2})(360/N)$ degrees, where n is an integer including zero.

5. An electro-mechanical machine comprising:

first and second flat spaced parallel stator members, each having a circular array of 2N magnetic poles of alternately opposite polarity, where N is the number of pairs of such poles, each pole of one stator member being opposite and spaced from an opposite-polarity pole of the other stator member, a disc armature rotor between said stator members, a circular array of 2N coils on each face of said disc rotor, each said coil array being between said stator pole arrays, each of said coils being a one-layer spiral with non-overlapping turns mounted flat on said disc rotor, a commutator rotatable together with said rotor, and having 4N segments, said segments being arranged in N sequential sets of four sequential segments each, the N corresponding (i.e. first second, third or fourth) segments of each set being interconnected, the coils on one-half of one face of said rotor being connected together and to one pair of segments of said commutator segment sets, the coils on the other half of said one face of said rotor being connected together and to the remaining pair of segments of said segment sets, the coils on one half of the other face of said rotor being connected together and to a segment of said one pair and a segment of said remaining pair, the coils on the other half of said other rotor face being connected together and to the other segment of said one pair and the other segment of said remaining pair, the coil array on one rotor face being angularly displaced relative to the coil array of the other rotor face by one-half of the angular pitch between two adjacent coils; and at least one pair of brushes contacting said commutator, the brushes of each pair being separated by an angle of substantially $(n+\frac{1}{2})$ $(360/N)$ degrees, where n is an integer including zero.

6. A machine as in claim 5, each of said stator members comprising:

a ferro-magnetic backing plate, said array of magnetic poles being provided by a corresponding plurality of permanent magnets arranged in said circular array on said backing plate, each of said magnets occupying a pie-shaped area with a relatively small separation between it and adjacent magnets, each of said magnets being magnetized over its entire area in a direction perpendicular to said plate, adjacent magnets being magnetized in opposite directions, and each magnet of the first stator member being opposed to and magnetized in the same direction as a magnet of said second stator member, with a gap between said two opposed magnets, said rotor coils being movable circumferentially through said gaps.

7. An electromechanical machine comprising:

first and second flat spaced parallel stator members, each having a circular array of 2N magnetic poles of alternatively opposite polarity, where N is the number of pairs of such poles, each pole of one stator member being opposite and spaced from an opposite polarity pole of the other stator member, a disc armature rotor having a circular array of coils on each face thereof between the stator members, wherein the coils are formed by four conductive pathways, each of which is arranged to form a continuous array of N coils on a respective one half of a face of the rotor, and commutator means rotatable with the rotor and being operatively connected to the four conductive pathways.

8. The machine as described in claim 7 wherein the 2N coils are symmetrically arrayed on each face of the rotor and the coil array on one rotor face is angularly offset relative to the coil array of the other rotor face by one half of the angular pitch between two adjacent coils.

9. The machine as described in claim 7 wherein the commutator means has N sequential sets of four sequential segments each, the N corresponding (i.e., first, second, third or fourth) segments of each set being interconnected.

10. The machine as described in claim 7 wherein each of the coils is a one-layer spiral with non-overlapping turns arranged flat on the rotor face.

11. The machine as described in claim 7 wherein the coils are made of square wire.

* * * * *